UNITED STATES PATENT OFFICE.

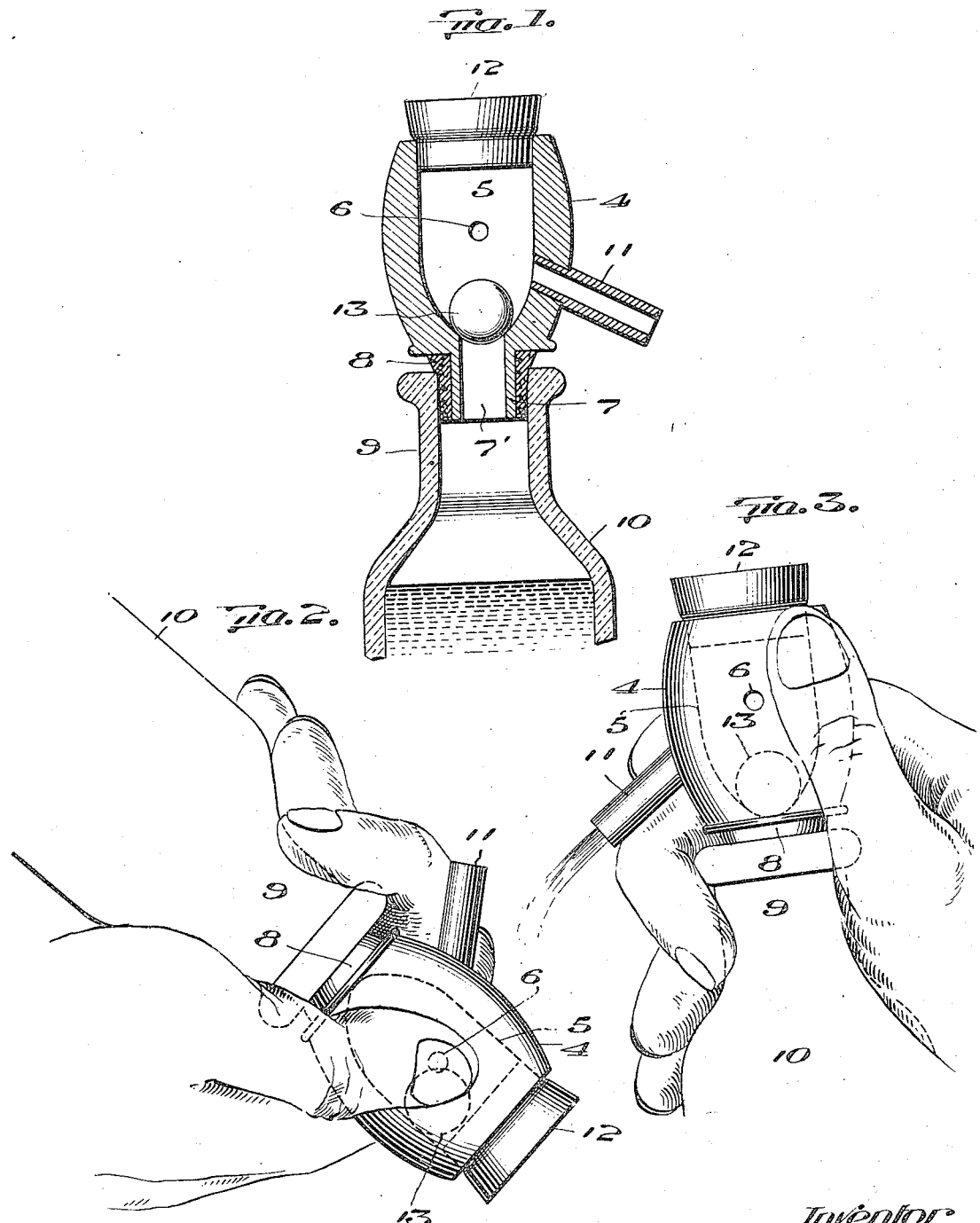

WILLIAM F. DICKEY, OF NEWPORT, NEW HAMPSHIRE.

LIQUID-DISPENSING DEVICE.

1,322,881.

Specification of Letters Patent. Patented Nov. 25, 1919.

Application filed May 9, 1917. Serial No. 167,450.

*To all whom it may concern:*

Be it known that I, WILLIAM F. DICKEY, a citizen of the United States, residing at Newport, in the county of Sullivan and State of New Hampshire, have invented new and useful Improvements in Liquid-Dispensing Devices, of which the following is a specification.

This invention relates to measuring and dispensing devices more particularly adapted for attachment to bottles for measuring and delivering a predetermined quantity of liquid.

The object of this invention is to provide a device for measuring and delivering an exact predetermined quantity of a liquid, the amount of the liquid being automatically measured and never varying, and to accomplish the same simply and with great ease of manipulation to the operator.

While applicant has shown this device attached to a bottle, it will be readily understood that he may attach it to any other liquid containing receptacle, and by varying the size of the measuring chamber may use the device for many purposes, as measuring chemicals, drinks, and so forth.

The above and other objects of the invention are obtained in the structure described in the following specification and illustrated in the accompanying drawings, wherein—

Figure 1 is a vertical sectional view through the center of the measuring device and the upper part of the bottle to which it is applied.

Fig. 2 is an elevational view showing the position of the device when charging or filling the same.

Fig. 3 is an elevational view showing the position of the device when discharging the liquid.

Referring to the drawings:

4 designates a measuring vessel of any desired shape, applicant making use of an oval shaped vessel in this case. The measuring vessel 4 has a central chamber 5 for the reception of the liquid to be measured, the size of the chamber 5 determining the amount of liquid that will be dispensed with each operation. The chamber 5 is provided with an air vent 6 shown in the drawings as located at one side and somewhat below the top of the chamber, and this vent allows atmospheric pressure to be communicated to the interior of the chamber to force the fluid therefrom during the discharging operation. There is an inlet opening 7' leading into the chamber 5 at one end. This inlet opening 7' is for the purpose of admission of fluid from the large retaining receptacle to the measuring chamber, and while any construction which would permit of fastening this measuring vessel to a liquid containter would lie within the spirit of this invention, applicant has shown the inlet 7' as consisting of the bore of a tube 7 around which is an annular cork collar 8 for holding the measuring device in the neck 9 of a bottle 10. The measuring chamber has an outlet opening which, in the present instance, is formed by the bore of a tube 11, through which the fluid, in measured quantities, is discharged. The tube enters the chamber 5 at a point preferably a short distance above the inlet opening, thus allowing most of the liquid contained in the chamber to be discharged at each operation. As shown in the drawings, 11 is downwardly inclined at an angle to the horizontal for the purpose of facilitating the drainage of the chamber 5.

The top of the vessel 4 may be integral with the body portion or side walls, or the chamber 5 may be, as shown in the drawings, open and adapted to receive a cover, stopper, or other closing device. In this particular instance, a stopper 12 is used which closes the opening and makes a fluid- and air-tight connection with the walls of the chamber.

To prevent the fluid which flows from the bottle 10 into the chamber 5 from flowing back into the bottle when the bottle is returned from an inverted to its normal position, the inlet opening is controlled by a suitable valve mechanism. In the present instance, I have shown for illustrative purpose a ball valve 13 for this purpose. The wall of the chamber 5 is sloped toward the inlet opening so as to provide a valve seat and by this construction, the ball 13 always rests on its seat when the bottle is in upright position.

In the operation of the device the thumb is put over the air vent 6 and the bottle inverted into the position shown in Fig. 2. In this position the ball 13 rolls from in front of the inlet opening and allows the liquid to fill the chamber. Since no air can enter the bottle, there will be no overflow through the outlet spout 11. The bottle is now brought back to its original position when the ball 13 rolls back blocking the open passage between the bottle 10 and the chamber 5 by taking the position shown in Fig. 3. The thumb is now removed from its position over the air vent 6 allowing the access of air to the chamber 5, which causes the fluid to be discharged through outlet spout 11 into the desired receptacle. As will be seen the operation is very simple and positive in action and exactly the same amount of liquid is always obtained, the amount of the liquid depending on the size of the chamber 5.

It will be easily seen that the structure is susceptible of many changes in shape and size of parts without departing from the spirit of the invention as set forth in the following claims.

What I claim is:—

1. In a liquid measuring device, a measuring vessel having an inlet opening at the lower end thereof, a ball valve normally in position on a valve seat formed by the converging inner walls of the measuring vessel adjacent said inlet opening, an outlet tube or spout extending from the wall of said measuring vessel in a downward direction, said vessel having an air vent in its wall to admit atmospheric pressure thereto.

2. In a liquid measuring device, a measuring vessel having an inlet opening at the lower end thereof, a ball valve normally in position on a valve seat formed by the converging inner walls of the measuring vessel adjacent said inlet opening, an outlet tube or spout extending from the wall of said measuring vessel in a downward direction, said measuring vessel being provided at its lower end with an annular cork collar.

3. In a liquid measuring device, a cup-shaped measuring vessel having an inlet opening at the lower end thereof, a ball valve in said vessel, a valve seat formed by the converging inner walls of the measuring vessel adjacent said inlet opening, an air vent in the side wall of the vessel, an outlet tube or spout extending from a side wall of said vessel in a downward direction, an annular cork collar fitted around the lower portion of the outer wall of the measuring vessel, and a stopper in the top of said vessel, such stopper being easily removable from without the vessel.

In testimony whereof I have hereunto set my hand in presence of two subscribing witnesses.

WILLIAM F. DICKEY.

Witnesses:
JOHN MCCRILLIS,
EDNA L. CHAMBERLAIN.